United States Patent
Pak et al.

(10) Patent No.: US 7,670,582 B2
(45) Date of Patent: Mar. 2, 2010

(54) MESOPOROUS CARBON AND METHOD OF PRODUCING THE SAME

(75) Inventors: Chan-ho Pak, Seoul (KR); Sang-hoon Joo, Yongin-si (KR); Hyuk Chang, Seongnami-si (KR); Ji-man Kim, Suwon-si (KR); Hyung-ik Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 689 days.

(21) Appl. No.: 11/434,113

(22) Filed: May 16, 2006

(65) Prior Publication Data

US 2006/0263288 A1 Nov. 23, 2006

(30) Foreign Application Priority Data

May 18, 2005 (KR) .................. 10-2005-0041655

(51) Int. Cl.
*C01B 31/00* (2006.01)
*B01J 21/18* (2006.01)
*H01M 4/96* (2006.01)

(52) U.S. Cl. .................. 423/445 R; 502/416; 502/182; 429/44

(58) Field of Classification Search ............ None
See application file for complete search history.

(56) References Cited

U.S. PATENT DOCUMENTS

| | | | |
|---|---|---|---|
| 6,585,948 B1 | 7/2003 | Ryoo et al. | |
| 6,812,187 B1* | 11/2004 | Pak et al. | 502/180 |
| 2004/0186317 A1* | 9/2004 | Tiwari et al. | 562/408 |
| 2005/0260118 A1* | 11/2005 | Lu et al. | 423/445 R |

FOREIGN PATENT DOCUMENTS

| | | |
|---|---|---|
| CN | 1425606 | 6/2003 |
| JP | 06-211509 | 8/1994 |
| JP | 2004-044064 | 2/2004 |
| JP | 2004-244311 | 9/2004 |
| JP | 2006-212480 | 8/2006 |
| KR | 2001-1127 | 1/2001 |
| KR | 10-307692 | 8/2001 |
| WO | WO 03/097909 | * 11/2003 |

OTHER PUBLICATIONS

Office Action dated Jul. 4, 2008 issued by the Patent Office of the People's Republic of China.
Office Action issued by Japanese Patent Office in Japanese Patent Application No. 2006-13221 on Jun. 16, 2009.

* cited by examiner

*Primary Examiner*—Melvin C Mayes
*Assistant Examiner*—Sheng Han
(74) *Attorney, Agent, or Firm*—Stein McEwen, LLP

(57) ABSTRACT

Provided are a mesoporous carbon and a method of preparing the same, where the mesoporous carbon is prepared using phenanthrene as a carbon source and a mesoporous silica as a template. The mesoporous carbon has a significantly low plane resistance, which can be obtained without sacrificing other physical properties, and thus obtains a high conductivity and effectively transfers electrical energy. Accordingly, a fuel cell electrode or a fuel cell which is produced using the mesoporous carbon as a conductive material has high efficiency. Furthermore, the mesoporous carbon may be used in various electrochemical devices as a conductive material.

23 Claims, 5 Drawing Sheets

MESOPOROUS CARBON AND METHOD OF PRODUCING THE SAME

CROSS-REFERENCE TO RELATED APPLICATION

This application claims the benefit of Korean Application No. 2005-41655, filed May 18, 2005, in the Korean Intellectual Property Office, the entire content of which is incorporated herein by reference.

BACKGROUND OF THE INVENTION

1. Field of the Invention

Aspects of the present invention relate to a mesoporous carbon and a method of producing the same, and more particularly, to a mesoporous carbon that has a low plane resistance (sometimes referred to as sheet resistance) suitable for being an efficient conductive material and a method of producing the same.

2. Description of the Related Art

As environmental problems are becoming more serious day by day, fuel cells, which are a clean energy source that can be used instead of fossil fuels, have drawn much attention. As a result, the amount of research being carried out on fuel cells is increasing.

A group of fuel cells forms an energy generating system in which a direct current is generated by reacting a fuel, such as hydrogen, natural gas, or methanol, with an oxidizing agent. In general, a fuel cell includes an anode (a fuel electrode) that electrochemically oxidizes a fuel supplied, a cathode (air electrode) that electrochemically reduces an oxidizing agent, and an electrolyte membrane interposed between the anode and the cathode that acts as a path through which ions generated in the anode flow to the cathode. As a result of the fuel oxidation reaction at the anode, electrons are generated. The electrons travel through an external circuit and then return to the cathode to participate in the reduction of the oxidizing agent.

In a fuel cell having the above-mentioned structure, a catalyst that is contained in the cathode and the anode to facilitate the electrochemical reactions plays an important role, and thus, the activity of the catalyst used in the electrodes should be maximized. Since the activity of the catalyst increases as the reaction surface area of the catalyst increases, catalyst particles should be reduced to a few nm in diameter to increase the reaction surface area and be uniformly distributed in the electrode. These requirements can be realized by obtaining a supported catalyst with a wide surface area. As a result, much research on supported catalysts with wide surface areas has been carried out.

Meanwhile, in addition to the wide surface area, which may be obtained through high porosity, a support for a fuel cell catalyst must be electrically conductive to act as a path for the flow of electrons. A conventional example of the support for the fuel cell catalyst is an amorphous microporous carbon powder, such as activated carbon or carbon black.

An amorphous microporous carbon powder is generally formed by chemically and/or physically activating wood, peat, charcoal, coal, brown coal, bark of a palm tree, petroleum coke, or the like. An activated carbon prepared using these materials as above may have pores of about 1 nm or less in diameter and a surface area of about 60 to 1000 $m^2/g$. More particularly, commercially available Vulcan and Ketjen Black are amorphous microporous carbon powders that have specific surface areas of about 230 $m^2/g$ and about 800 $m^2/g$, respectively, and their primary particles are 100 nm or less in size.

However, it is well known that micropores of such amorphous microporous carbon particles are poorly connected. Therefore, in a conventional direct methanol fuel cell (DMFC), a supported catalyst that is prepared using such an amorphous microporous carbon powder as the support exhibits a much lower reactivity than a precious metal catalyst. However, when the precious metal itself is used as the entire catalyst, the amount of metal required is greater, and thus, the manufacturing costs of the DMFC increase prohibitively. Accordingly, the development of a supported catalyst that facilitates catalyst activity is required, and thus, the development of an improved carbon support is required.

To this end, a mesoporous carbon molecular sieve disclosed in Korean Laid-Open Publication No. 2001-1127 (corresponding to U.S. Pat. No. 6,585,948) can be used. This Korean publication discloses a method of preparing an ordered mesoporous carbon molecular sieve by nano-replication using a mesoporous silica molecular sieve that is prepared using a surfactant as a template material. More particularly, based on a nano-replication technique, a newly ordered mesoporous carbon molecular sieve, of which micropores and mesopores with predetermined diameters are regularly ordered, can be produced by using as a template an ordered mesoporous silica molecular sieve, such as "MCM-48", "SBA-1", or "SBA-15", in which mesopores are connected three-dimensionally through micropores.

However, since mesoporous carbon molecular sieves that have been developed to date have relatively high plane resistance, consequently, their application to electrochemical devices, such as fuel cells, has been limited. Accordingly, the development of a carbon molecular sieve that has a low plane resistance to increase conductivity is required.

SUMMARY OF THE INVENTION

Aspects of the present invention provide a mesoporous carbon that has a significantly low plane resistance obtained without sacrificing other physical properties, and thus, obtains a high conductivity, and can be used as an electrode forming material. Aspects of the present invention also provide a method of preparing the mesoporous carbon. Aspects of the present invention also provide a supported catalyst containing the mesoporous carbon as a support. Another aspect of the present invention provides a fuel cell including the supported catalyst of mesoporous carbon.

According to an aspect of the present invention, there is provided the mesoporous carbon having mesopores, wherein the plane resistance of the mesoporous carbon is 250 $m\Omega/cm^2$ or less at a pressure of 75.4 $kg/cm^2$, and the average diameter of the mesopores is in the range of 2 to 20 nm.

According to another aspect of the present invention, there is provided a method of preparing the mesoporous carbon, the method including: (a) preparing 100 parts by weight of a precursor mixture that contains 5-15 parts by weight of phenanthrene, 10-35 parts by weight of an acid, and 55-80 parts by weight of a solvent; (b) impregnating a mesoporous silica with the precursor mixture; (c) heat treating the result of operation (b); (d) carbonizing the result of operation (c); and (e) removing the mesoporous silica by using a solution that is capable of selectively dissolving the mesoporous silica only.

According to yet another aspect of the present invention, there is provided the supported catalyst including: the mesoporous carbon; and metal catalyst particles that are distributed and supported on the mesoporous carbon. According to still another aspect of the present invention, there is provided the fuel cell including: a cathode; an anode; and an electrolyte membrane interposed between the cathode and the anode, wherein at least one of the cathode and the anode contains the supported catalyst.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A mesoporous carbon according to an embodiment of the present invention is prepared using phenanthrene as a carbon source. The mesoporous carbon has a plane resistance (sometimes referred to as sheet resistance) of 250 m$\Omega$/cm$^2$ or less at a pressure of 75.4 kg/cm$^2$. Mesopores of the mesoporous carbon have an average diameter of 2 to 20 nm. The plane resistance of the mesoporous carbon according to an embodiment of the present invention is 30%-80% less than the plane resistance of conventional mesoporous carbons. A possible reason for such a low plane resistance of the mesoporous carbon according to an embodiment of the present invention might lie in the graphite-like structure of carbonized phenanthrenes.

While a conventional amorphous microporous carbon powder includes micropores only, the mesoporous carbon powder according to an embodiment of the present invention includes mesopores as well as micropores in a proper ratio. Herein, according to the International Union of Pure and Applied Chemistry (IUPAC), a micropore is defined as a pore of about 2 nm or less in diameter, and a mesopore is defined as a pore of about 2 to 50 nm in diameter.

The mesoporous carbon according to an embodiment of the present invention is characterized by a plane resistance, a specific surface area, a size of the primary particle, the average diameter of a mesopore, and peaks that appear in X-ray diffraction analysis. The mesoporous carbon, according to an embodiment of the present invention, has a plane resistance of 250 m$\Omega$/cm$^2$ or less, which is measured using a 4-point probe method at a pressure of 75.4 kg/cm$^2$. While not required in all aspects, the mesoporous carbon has a plane resistance between 10 m$\Omega$)/cm$^2$ and 250 m$\Omega$/cm$^2$.

While not required in all aspects, the average diameter of a mesopore in the mesoporous carbon according to an embodiment of the present invention is in the range of 2 to 20 nm. When the average diameter of the mesopore is less than 2 nm, a fuel delivery may occur non-uniformly and activity of the catalyst will be limited. On the other hand, when the average diameter of the mesopore is greater than 20 nm, catalyst particles will easily increase in size when the catalyst is produced, and thus, the efficiency of the catalyst will be diminished.

While not required in all aspects, the mesoporous carbon according to an embodiment of the present invention has a specific surface area of 300 to 2000 m$^2$/g. When the specific surface area of the mesoporous carbon is less than 300 m$^2$/g, it is difficult to achieve improved uniform dispersion of metal particles at a high loading because the specific surface area is too small. On the other hand, when the specific surface area of the mesoporous carbon is greater than 2000 m$^2$/g, limitation of fuel or mass transfer occurs because of too many micropores, and thus, the efficiency of the catalyst decreases.

While not required in all aspects, the mesoporous carbon according to an embodiment of the present invention has primary particles of 100 to 500 nm in size. When the size of the primary particles of the mesoporous carbon is less than 100 nm, the particles are easily agglomerated, and thus, the entire specific surface area is reduced. Similarly, when the size of the primary particles of the mesoporous carbon is greater than 500 nm, mass transfer efficiently decreases.

Figure 5:
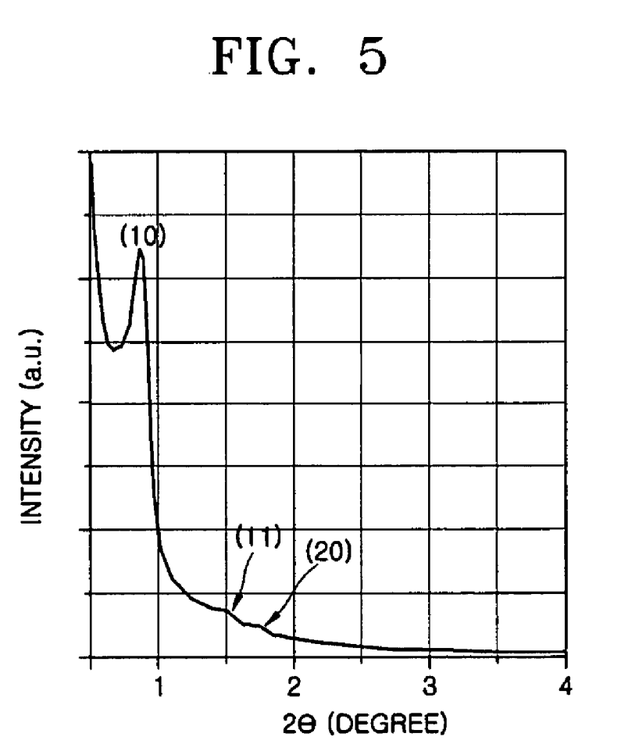
FIG. 5 is a graph illustrating the results of an X-ray diffraction analysis of the mesoporous carbon prepared according to Example 1.

In FIG. 5, the results of X-ray diffraction analysis of the mesoporous carbon according to an embodiment of the present invention are illustrated. As shown, one or more sharp peaks 10, 11, 20 appear in a range of 5° or less indicative of regularly arranged pores in the mesoporous carbon. That is, in the graph illustrating the result of the X-ray diffraction analysis of the mesoporous carbon, a main peak 10 appears for 2$\theta$ between 0.5° and 1.5° and at least one peak 11 or 20 appears additionally below 5°.

A method of preparing the mesoporous carbon according to an embodiment of the present invention will now be described. First, phenanthrene and an acid are dissolved in a solvent to prepare a precursor mixture. While not required in all aspects, the amount of phenanthrene is in the range of 5 to 15 parts by weight of the precursor mixture, the amount of the acid is in the range of 10 to 35 parts by weight of the precursor mixture, and the amount of the solvent is in the range of 55 to 80 parts by weight based on 100 parts by weight of the entire precursor mixture.

While not required in all aspects, the phenanthrene is represented by Formula 1, and cannot be replaced with anthracene, which is a structure isomer thereof, in the present embodiment of the present invention.

(1)

While not required in all aspects, the acid that is used for preparing the precursor mixture is an organic acid or an inorganic acid. More particularly, the acid may be a sulfuric acid, a nitric acid, a phosphoric acid, an organic acid thereof, a hydrochloric acid, or a mixture thereof. For example, the acid may be sulfuric acid and an organic acid thereof. For another example, the acid may be a para-toluene sulfuric acid.

While not required in all aspects, the solvent that is used for preparing the precursor mixture is any solvent formed of a single component or multi-components that can dissolve the phenanthrene and the acid. More particularly, examples of the solvent include water, acetone, methanol, ethanol, isopropylalcohol, n-propylalcohol, butylalcohol, dimethylacetamid (DMAc), dimethylformamid, dimethylsulfoxide (DMSO), N-methyl-2-pyrrolidone (NMP), tetrahydrofurane (THF), tetrabutylacetate, n-butylacetate, m-crezole, toluene, ethyleneglycol (EG), γ-butyrolactone, hexafluoroisopropanol (HFIP), or the like. These materials can be used alone or in combination.

As described above and while not required in all aspects, the amount of the phenanthrene is in the range of 5 to 15 parts by weight based on 100 parts by weight of the entire precursor mixture. When the amount of the phenanthrene is less than 5 parts by weight, it is generally difficult to form the mesoporous carbon. When the amount of the phenanthrene is greater than 15 parts by weight, it is generally difficult to dissolve the phenanthrene in the solvent, and particles are likely to be agglomerated such that the surface area of the mesoporous carbon decreases.

While not required in all aspects, the amount of the acid is in the range of 10 to 35 parts by weight based on 100 parts by weight of the entire precursor mixture. When the amount of the acid is less than 10 parts by weight, generation of a mesoporous carbon is generally not facilitated. When the amount of the acid is greater than 35 parts by weight, formation of a carbon material is generally facilitated even outside the mesoporous silica, and thus, a degree of order is reduced.

While not required in all aspects, the amount of the solvent is in the range of 55-80 parts by weight based on 100 parts by weight of the entire precursor mixture. When the amount of the solvent is less than 55 parts by weight, the precursor is generally insufficiently dissolved in the solvent. When the amount of the solvent is greater than 80 parts by weight, particles are generally very likely to be agglomerated.

While not required in all aspects, the weight ratio of the phenanthrene to the acid is in range of 1:2.5 to 1:3.5, such as, 1:2.7 to 1:3.3. When the weight ratio of the phenanthrene to the acid is within the specified range, the phenanthrene generally will homogenously react with the acid so that the mesoporous carbon may be readily produced.

A mesoporous silica is impregnated with the precursor mixture prepared above. The mesoporous silica may be a molecular sieve material structured such that one-dimensional pores are mutually connected by micropores, but is not limited thereto. More particularly, the mesoporous silica may be MCM-48 having a cubic structure, SBA-1 having another cubic structure, SBA-15 having a hexagonal structure, KIT-1, MSU-1, or the like, which have a three-dimensional connection structure. In this case, KIT-1 and MSU-1 are each structured such that pores are three dimensionally, irregularly connected. Furthermore, the mesoporous silica may be any type of a molecular sieve material that contains any type of mesoporous material structured such that one-dimensional pores are mutually connected by micropores. In addition, silica nanoparticles can be used as templates.

While not required in all aspects, the amount of the mesoporous silica that is impregnated with the precursor mixture is in the range of 5 to 15 parts by weight based on 100 parts by weight of the precursor mixture. When the amount of the mesoporous silica is less than 5 parts by weight, the amount of the precursor mixture is comparatively too high. As a result, after impregnation, particles are generally likely to be agglomerated so that the surface area of the mesoporous carbon decreases. When the amount of the mesoporous silica is greater than 15 parts by weight, the amount of the precursor mixture is comparatively too low such that a carbon structure is generally not sufficiently formed in the silica pores. The impregnating temperature is not limited, and may be room temperature according to an aspect of the invention.

The precursor mixture that is impregnated in the silica as described above may be dried at room temperature. The drying temperature is not limited, and may be room temperature. In addition, for quick drying, the drying process may be performed under reduced pressure according to an aspect of the invention.

While not required in all aspects, the dried mixture is heat-treated. The heat treatment is performed at 50 to 250° C. When the heat treatment temperature is less than 50° C., the structure of the mesoprous carbon may be inappropriately formed. When the heat treatment temperature is higher than 250° C., uniformity of the mesoporous carbon product may decrease. Alternatively, the heat treatment may be divided into a first heat treatment and a second heat treatment. For example, the first heat treatment may be performed at about 50° C. to about 150° C., and the second heat treatment may be performed at about 150° C. to about 250° C. Through the heat treatment, a mesoporous carbon structure is formed, and the liquid solvent and the like are completely removed.

Although the heat-treated result after performing the above processes only once can be directly carbonized, the above-mentioned processes may be repeated two to ten times. That is, a process in which the heat-treated result is impregnated with the precursor mixture prepared above, and then, the heat treatment is performed can be repeatedly performed, and the precursor mixture may be carbonized thereafter. Alternatively, according to an aspect of the invention, the drying and heat treating operations may be achieved directly by carbonization of the precursor mixture that is impregnated in the silica.

When the precursor mixture prepared above is directly carbonized without the repetition of the impregnation and the heat treatment, the carbon structure may be incompletely formed in the mesoporous silica pores. On the other hand, repetition of impregnation and the heat treatment more than 10 times results in no additional beneficial yield.

As described above, the heat-treated result is carbonized to obtain an ordered mesoporous carbon structure. The phenanthrene that is impregnated into the mesoporous silica template becomes graphitized through the carbonization process. The carbonization may be achieved by, for example, heating the heat-treated result to about 700° C. to 1500° C. When the carbonizing temperature is less than 700° C., graphitization occurs incompletely and thus, the degree of order may be incomplete. When the carbonizing temperature is greater than 1500° C., carbon may thermally decompose or the structure of the mesoporous silica acting as the template may be deformed.

The carbonization may be performed in a non-oxidizing atmosphere according to an aspect of the invention. The non-oxidizing atmosphere such as a vacuum atmosphere, a nitrogen atmosphere, and an inert gas atmosphere may be used. In this case, the residual solvents and/or acids evaporate or decompose so that the residual solvents and/or acids are removed. However, this is not required in all aspects.

As described above, the phenanthrene impregnated into the mesoporous silica template is converted into an ordered mesoporous carbon, and then, the mesoporous silica is removed using a solvent that can selectively dissolve the mesoporous silica. The solvent that can selectively dissolve the mesoporous silica may include, for example, an aqueous HF solution or an aqueous NaOH solution. It is well known that the mesoporous silica becomes a water-soluble silicate through alkali melting or carbonate dissociation, and reacts with HF to form $SiF_4$, which easily erodes. By removing the mesoporous silica, the ordered mesoporous carbon can be separated.

A supported catalyst that contains the ordered mesoporous carbon acting as a support will now be described in detail. A supported catalyst according to an embodiment of the present invention includes the mesoporous carbon according to an embodiment of the present invention, and metal catalyst particles that are distributed and supported on the mesoporous carbon. More particularly, the metal catalyst particles are distributed and supported on the surface or in the pores of the mesoporous carbon.

The metal catalyst that can be used in the supported catalyst according to an embodiment of the present invention is not limited, and may be one of Ti, V, Cr, Mn, Fe, Co, Ni, Cu, Zn, Al, Mo, Se, Sn, Pt, Ru, Pd, W, Ir, Os, Rh, Nb, Ta, Pb, Bi, or a combination thereof. A suitable metal catalyst may vary according to a reaction to which the supported catalyst, according to an embodiment of the present invention, is to be subjected. In addition, the metal catalyst may be a single metal or an alloy of two or more metals.

More particularly, when the supported catalyst according to an embodiment of the present invention is used in a catalyst layer of a cathode or an anode of a fuel cell, such as a PAFC (Phosphoric-Acid Fuel Cell) or a PEMFC (Proton Exchange Membrane Fuel Cell), Pt can be used as the metal catalyst. In another embodiment, the supported catalyst may be used in a catalyst layer of an anode of a DMFC, in which case, an alloy of Pt and Ru may be used as the metal catalyst. In this case, the atomic ratio of Pt to Ru may be, in general, in the range of about 0.5:1 to about 2:1. In yet another embodiment, the supported catalyst may be used in a catalyst layer of a cathode of a DMFC, in which case, Pt may be used as the metal catalyst.

When the average particle size of the metal catalyst particles is too small, the catalyst reaction generally may not be effective. On the other hand, when the average particle size of the metal catalyst particles is too large, the reaction surface area of the entire catalyst particle generally is reduced and thus, the efficiency of the supported catalyst may be reduced. In consideration of these problems, the average particle size of the metal catalyst particle may be in the range of about 1 nm to about 5 nm according to an aspect of the invention. However, it is understood other sizes could be used for these particles and/or particles to be developed When the amount of the metal catalyst contained in the supported catalyst is too small, the metal catalyst may have little effect when applied to a fuel cell. When the amount of the metal catalyst particles contained in the supported catalyst is too large, the manufacturing costs may prohibitively increase and the catalyst particle size may increase as well. In consideration of these problems, the amount of the metal catalyst contained in the supported catalyst may be in the range of about 40 to about 90 by parts by weight based on 100 parts by weight of the supported catalyst.

The supported catalyst according to an embodiment of the present invention can be formed using various known methods of producing a supported catalyst. For example, the supported catalyst according to an embodiment of the present invention may be formed by impregnating a support with a metal catalyst precursor solution and reducing the impregnated metal catalyst precursor. The method of producing a supported catalyst is described in various references in detail and thus will not be described herein in further detail.

Figure 6:
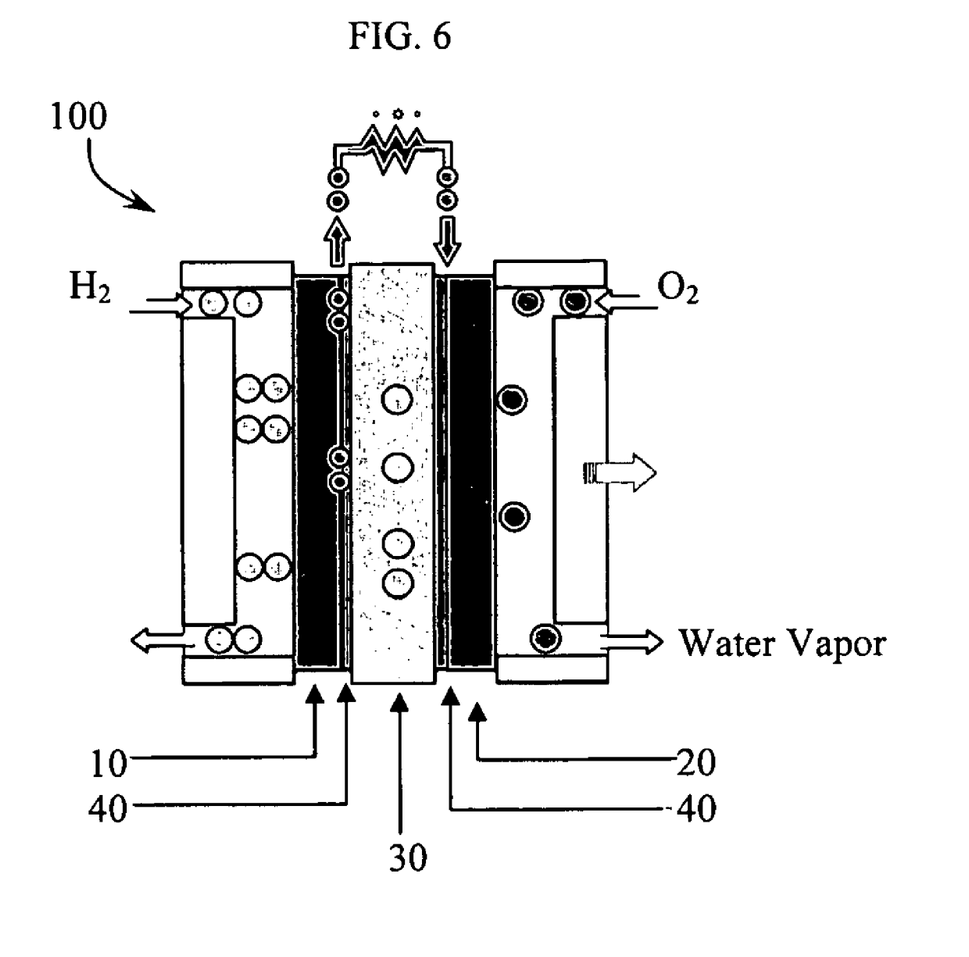
FIG. 6 is a schematic of a fuel cell according to an embodiment of the invention.

A fuel cell according to an embodiment of the present invention will now be described in detail with reference to FIG. 6. The fuel cell 100 according to an embodiment of the present invention includes a cathode 20, an anode 10, and an electrolyte membrane 30 interposed therebetween. In this case, at least one of the cathode 20 and the anode 10 includes the supported catalyst 40 according to an embodiment of the present invention described above and shown in FIG. 6.

The fuel cell 100 according to an embodiment of the present invention may be, for example, a PAFC, a PEMFC, or a DMFC. The structures of these fuel cells and methods of manufacturing them are not limited and are described in detail in various references. Accordingly, the structure and manufacturing method of the fuel cell will not be described herein in further detail.

The mesoporous carbon according to an embodiment of the present invention has a significantly low plane resistance, which can be obtained without sacrificing other physical properties, and thus, effectively transfers an electric energy. Accordingly, when the mesoporous carbon according to an embodiment of the present invention is used as a conductive material of a fuel cell electrode, the fuel cell electrode has high efficiency and a fuel cell with high efficiency can be produced. Furthermore, the mesoporous carbon according to an embodiment of the present invention can be used as a conductive material in various electrochemical devices.

Aspects of the present invention will be described in further detail with reference to the following examples. These examples are for illustrative purposes only and are not intended to limit the scope of the present invention. In the following examples and comparative examples, physical properties were measured using the following method.

Plane Resistance

Figure 1:
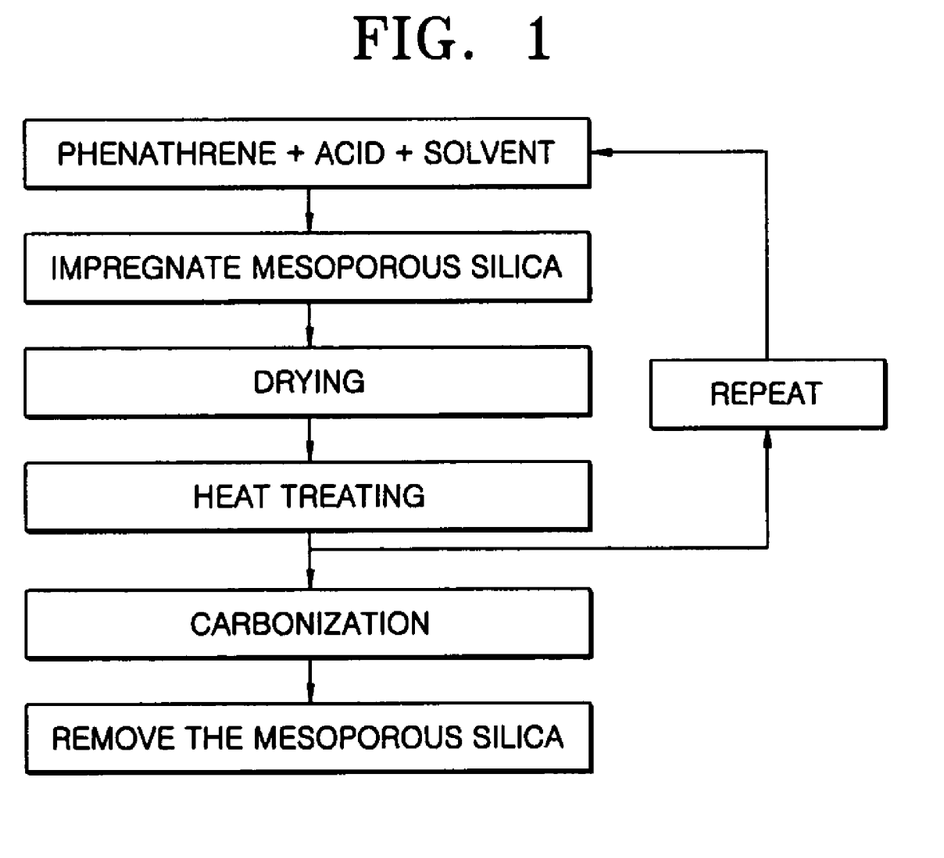
FIG. 1 is a flow chart illustrating a method of preparing a mesoporous carbon according to an embodiment of the present invention.
Figure 2:
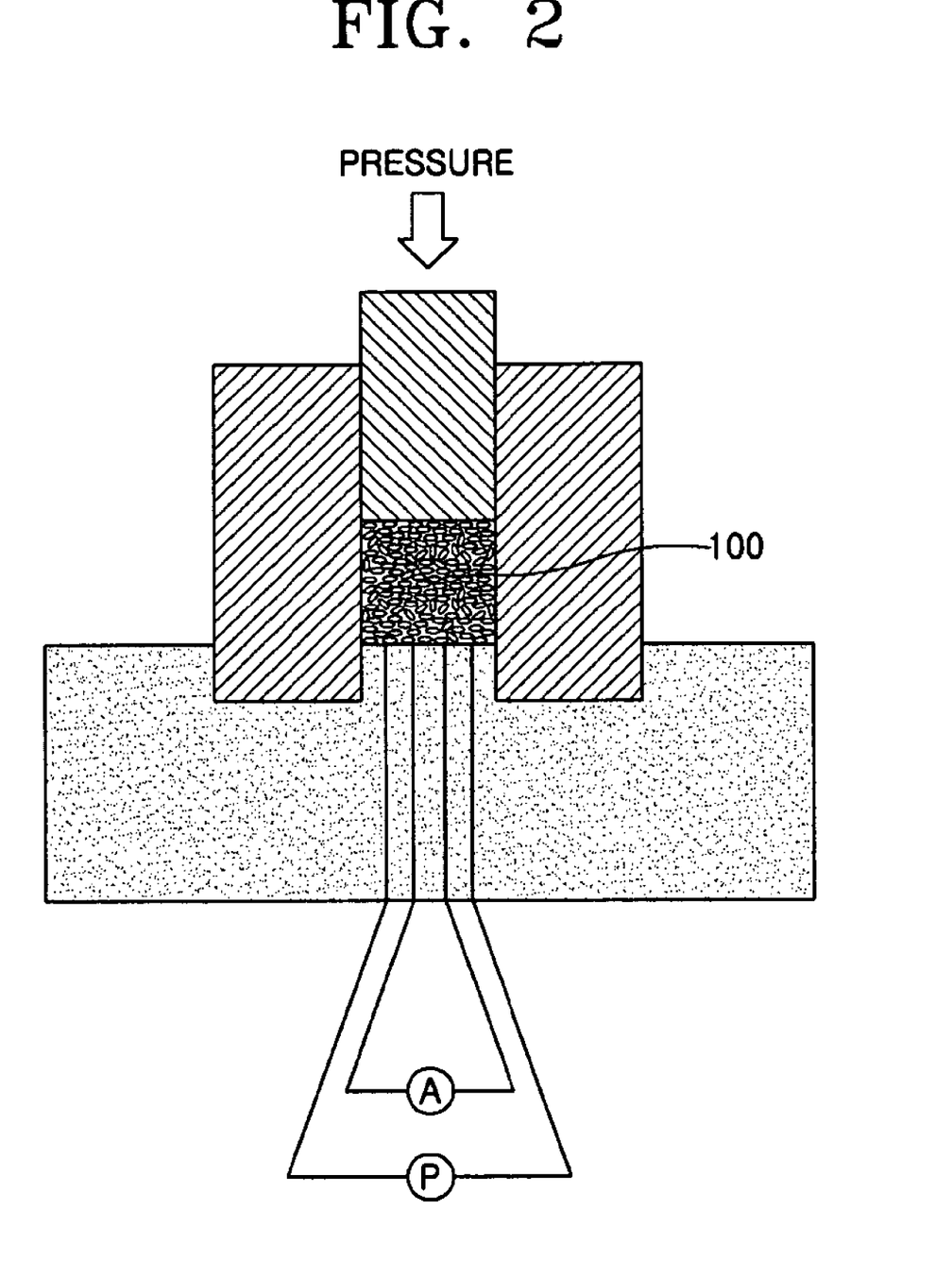
FIG. 2 is a schematic sectional view of an apparatus used to measure the plane resistance of the mesoporous carbon.

In the examples and comparative examples, the plane resistance was measured using a 4-point probe method. 50 mg of the mesoporous carbon 100 according to an embodiment of the present invention was placed in a plane resistance-measuring device illustrated in FIG. 2, and then pressures of 75.4 $kg_f/cm^2$ and 150.7 $kg_f/cm^2$ were respectively applied thereto and respective plane resistances were measured. The plane resistance-measuring device included a pair of electrodes for measuring a voltage and a pair of electrodes for measuring a current, disposed on a bottom of a chamber housing a material to be measured. Accordingly, the plane resistance-measuring device had a total of four electrodes.

Preparation of Mesoporous Carbon

EXAMPLE 1

0.9 g of phenanthrene and 2.7 g of a para-toluene sulfuric acid (TSA) were completely dissolved in 7.5 g of acetone to prepare a homogeneous precursor mixture. The precursor mixture was divided into four parts in a ratio of 41.0(i): 29.5(ii): 23.0(iii): 6.5(iv). 1 g of SBA-15 was impregnated with the solution (i). The impregnated SBA-15 was dried in a hood at room temperature for 30 minutes, and then dried at 160° C. for 10 minutes.

The dried result was impregnated with the solution (ii), and dried in the same manner as above. The same impregnation and drying processes were sequentially performed using solutions (iii) and (iv), respectively.

The dried sample was cooled to room temperature, slowly heated to 200° C. over one hour, and then maintained at 200° C. for 6 hours. Then, the resulting sample was slowly heated to 900° C. over four hours and then maintained at 900° C. for two hours. The carbonized result was added to a mixed solution of HF, water and ethanol and then filtered and washed. The adding and filtering processes were repeated to remove the SBA-15.

The plane resistance of the mesoporous carbon prepared above was measured and the result is shown in Table 1.

EXAMPLE 2

A mesoporous carbon was prepared in the same manner as in Example 1 except that 0.7 g of phenanthrene and 2.1 g of the para-toluene sulfuric acid were used. The plane resistance of the resultant mesoporous carbon was measured and the result is shown in Table 1.

EXAMPLE 3

A mesoporous carbon was prepared in the same manner as in Example 2 except that the carbonizing temperature was 1100° C. instead of 900° C. The plane resistance of the mesoporous carbon was measured and the result is shown in Table 1.

EXAMPLE 4

A mesoporous carbon was prepared in the same manner as in Example 3 except that 0.9 g of phenanthrene and 2.7 g of the para-toluene sulfuric acid were used. The plane resistance of the mesoporous carbon was measured and the result is shown in Table 1.

EXAMPLE 5

A mesoporous carbon was prepared in the same manner as in Example 1 except that 0.7 g of phenanthrene and 1.1 g of a sulfuric acid were used. The plane resistance of the mesoporous carbon was measured and the result is shown in Table 1.

COMPARATIVE EXAMPLE 1

A mesoporous carbon was prepared in the same manner as in Example 1 except that the phenanthrene was replaced with 1.5 g of sucrose and the para-toluene sulfuric acid was replaced with 0.18 g of a sulfuric acid. The plane resistance of the mesoporous carbon was measured and the result is shown in Table 1.

Referring to Table 1, the mesoporous carbon that was prepared using phenanthrene as the carbon source exhibited more than 80% lower plane resistance than the mesoporous carbon that was prepared using sucrose as the carbon source. In Table 1, TSA denotes para-toluene sulfuric acid. In addition, when the carbonizing temperature was higher (Examples 3 and 4) or the amount of phenanthrene was greater (Examples 1 and 4), the plane resistance was substantially lower. As identified in Example 5, the use of an inorganic acid such as a sulfuric acid resulted in a relatively low plane resistance.

Figure 3:
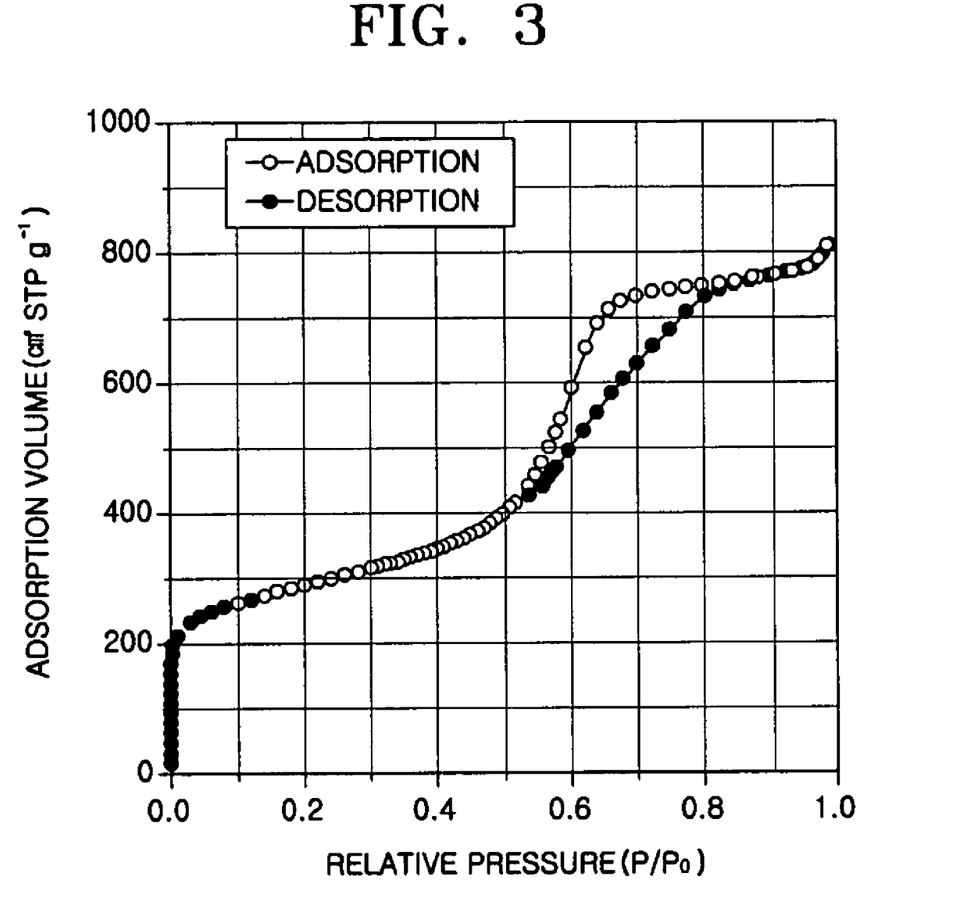
FIG. 3 is a graph illustrating the results of a BET (the method of Brunauer, Emmet and Teller) surface area analysis of the mesoporous carbon prepared according to Example 1.
Figure 4:
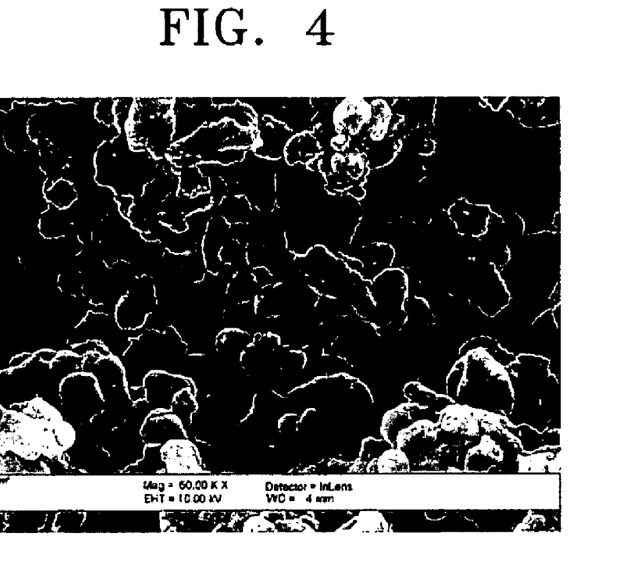
FIG. 4 is an SEM image of the surface of the mesoporous carbon prepared according to Example 1.

The BET surface area of the mesoporous carbon according to Example 1 was measured, and the results are illustrated in FIG. 3. From the result, it was determined that the specific surface area of the mesoporous carbon was 924 $m^2/g$, and a pore diameter of the mesoporous carbon was 5 nm. An SEM image of the mesoporous carbon is shown in FIG. 4.

Preparation of a Supported Catalyst

EXAMPLE 6

0.5 g of the mesoporous carbon prepared in Example 1 was placed in a plastic bag, and 0.9616 g of $H_2PtCl_6$ was dissolved in 1.5 ml of acetone. The solution was added to the plastic bag containing the mesoporous carbon. The mixed solution was dried in air for four hours, moved to a melting pot, and then dried in a drying device at 60° C. overnight. Then, the melting pot was placed in an electric furnace where nitrogen flowed. Nitrogen was passed through for 10 minutes. Then hydrogen was passed through while the temperature was increased from room temperature to 200° C. and then maintained at 200° C. for 2 hours so that a Pt salt impregnated in the mesoporous carbon was reduced. The gas flowing in the electric furnace was replaced with nitrogen. The temperature was increased by 5° C. min to 250° C., maintained for 5 hours, and then slowly cooled to room temperature. Then, the result was impregnated with 0.9616 g of $H_2PtCl_6$ dissolved in 1.5 ml of acetone, and then the reduction process was repeated. As a result, a supported catalyst in which the concentration of impregnated Pt was 60% by weight was obtained.

TABLE 1

| | Carbon Source (Amount used) | Acid (Amount used) | Carbonizing Temperature | Plane Resistance($m\Omega/cm^2$) | |
|---|---|---|---|---|---|
| | | | | 75.4 $kg_f/cm^2$ | 150.8 $kg_f/cm^2$ |
| Example 1 | phenanthrene (0.9 g) | TSA (2.7 g) | 900° C. | 56.7 | 22.3 |
| Example 2 | phenanthrene (0.7 g) | TSA (2.1 g) | 900° C. | 218.9 | 89.5 |
| Example 3 | phenanthrene (0.7 g) | TSA (2.1 g) | 1100° C. | 112.1 | 47.9 |
| Example 4 | phenanthrene (0.9 g) | TSA (2.7 g) | 1100° C. | 54.1 | 14.4 |
| Example 5 | phenanthrene (1.1 g) | Sulfuric Acid (1.1 g) | 900° C. | 170.0 | 78.8 |
| Comparative Example 1 | sucrose (1.5 g) | Sulfuric Acid (0.18 g) | 900° C. | 330.9 | 156.1 |

COMPARATIVE EXAMPLE 2

A supported catalyst was prepared by impregnating the result produced in Comparative Example 1 with Pt in the same manner as in Example 6.

Production of a Fuel Cell

EXAMPLE 7

The supported catalyst prepared according to Example 6 was dispersed in a solution prepared by dispersing Nafion 115 (produced by DuPont, Inc.) in isopropylalcohol, to form a slurry. The slurry was coated on a carbon electrode through a spraying process, and the concentration of the coated catalyst was 3 mg/cm$^2$ based on the amount of Pt. Then, the electrode was passed through a rolling machine to increase an adhesive force between a catalyst layer and a carbon paper, thus forming a cathode. An anode electrode was produced using a commonly available PtRu black catalyst. Then, a unit cell was produced using the cathode and the anode.

COMPARATIVE EXAMPLE 3

A unit cell was produced using the supported catalyst prepared according to Comparative Example 2 in the same manner as in Example 7.

Performances of the unit cells were measured at 50° C. while 2M methanol and an excessive amount of air were supplied, and the results are shown in Table 2. The fuel cell prepared according to Example 7 exhibited about 31% greater efficiency than the fuel cell prepared according to Comparative Example 3.

TABLE 2

|  | Current Density at 0.4 V (mA/cm$^2$) |
| --- | --- |
| Example 7 | 79.7 |
| Comparative Example 3 | 60.9 |

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of preparing a mesoporous carbon, the method comprising:
   preparing a precursor mixture that contains 5-15 parts by weight of phenanthrene, 10-35 parts by weight of an acid, and 55-80 parts by weight of a solvent based on 100 parts by weight of the precursor mixture;
   impregnating a mesoporous silica with the precursor mixture;
   heat treating the impregnated mesoporous silica;
   carbonizing the heat treated, impregnated mesoporous silica; and
   removing the mesoporous silica from the carbonized, heat treated, impregnated mesoporous silica by using a solution that is capable of selectively dissolving the mesoporous silica only.

2. The method of claim 1, wherein the acid is one of an organic acid or an inorganic acid.

3. The method of claim 1, wherein the acid is a sulfuric acid, a nitric acid, a phosphoric acid, an organic acid thereof, a hydrochloric acid, or combinations thereof.

4. The method of claim 1, wherein the solvent is water, acetone, methanol, ethanol, isopropylalcohol, n-propylalcohol, butylalcohol, dimethylacetamid(DMAc), dimethylformamid, dimethylsulfoxide (DMSO), N-methyl-2-pyrrolidone (NMP), tetrahydrofurane (THF), tetrabutylacetate, n-butylacetate, m-crezole, toluene, ethyleneglycol (EG), γ-butyrolactone, hexafluoroisopropanol (HFIP) or combinations thereof.

5. The method of claim 1, wherein a weight ratio of the phenanthrene to the acid is in a range at or between 1:2.5 and 1:3.5.

6. The method of claim 1, wherein the amount of the mesoporous silica is in a range at or between 5 and 15 parts by weight based on the 100 parts by weight of the precursor mixture.

7. The method of claim 1, wherein the preparing of the impregnated mesoporous silica comprises drying the impregnated mesoporous silica.

8. The method of claim 1, wherein the heat treatment is performed at a temperature at or between 50 and 250° C.

9. The method of claim 8, wherein the heat treatment comprises a first heat treatment and a second heat treatment sequentially performed, wherein the first heat treatment is performed at a temperature at or between 50 and 150° C. and a second heat treatment is performed at a temperature at or between 150 and 250° C.

10. The method of claim 1, wherein the preparing of the impregnated mesoporous silica comprises:
    again impregnating the heat treated, impregnated mesoporous silica with the precursor mixtures;
    again heat treating the impregnated, heat treated, impregnated mesoporous silica to prepare a repeatedly heat treated, impregnated mesoporous silica; and
    repeating the again impregnating and the again heat treating zero to nine times.

11. The method of claim 1, wherein the carbonization is performed at a temperature at or between 700 and 1500° C.

12. The method of claim 1, wherein the mesoporous silica is removed using one of HF and NaOH solutions.

13. A method of producing a mesoporous carbon, the method comprising:
    preparing a precursor mixture of 5-15 parts by weight of phenanthrene, 10-35 parts by weight of an acid, and 55-80 parts by weight of a solvent based on 100 parts by weight of the precursor mixture;
    impregnating a mesoporous silica with the precursor mixture;
    carbonizing the impregnated mesoporous silica to prepare mesoporous carbon; and
    separating the mesoporous carbon from the mesoporous silica.

14. The method of producing a mesoporous carbon as claimed in claim 13, further comprising:
    heat treating the impregnated mesoporous silica prior to carbonizing to prepare a dried impregnated mesoporous silica; and
    impregnating the dried impregnated mesoporous silica with the precursor mixture.

15. The method of claim 1, wherein the precursor mixture consists of 5-15 parts by weight of phenanthrene, 10-35 parts by weight of an acid, and 55-80 parts by weight of a solvent based on 100 parts by weight of the precursor mixture.

16. The method of claim 13, wherein the precursor mixture consists of 5-15 parts by weight of phenanthrene, 10-35 parts by weight of an acid, and 55-80 parts by weight of a solvent based on 100 parts by weight of the precursor mixture.

17. The method of claim 1, further comprising:
after removing the mesoporous silica, impregnating the mesoporous carbon with a metal catalyst precursor; and
reducing the metal catalyst precursor to form a supported catalyst comprising metal catalyst particles supported by the mesoporous carbon.

18. The method of claim 17, comprising:
applying the supported catalyst on an electrode support to form a first electrode; and
sequentially stacking the first electrode, an electrolyte membrane, and a second electrode.

19. The method of claim 13, further comprising:
after removing the mesoporous silica, impregnating the mesoporous carbon with a metal catalyst precursor; and
reducing the metal catalyst precursor to form a supported catalyst comprising metal catalyst particles supported by the mesoporous carbon.

20. The method of claim 19, comprising:
applying the supported catalyst on an electrode support to form a first electrode; and
sequentially stacking the first electrode, an electrolyte membrane, and a second electrode.

21. The method of claim 7, further comprising cooling the dried impregnated mesoporous silica to room temperature before the heat treating of the impregnated mesoporous silica.

22. The method of claim 8, wherein the heat treatment further comprises slowly heating the impregnated mesoporous silica from room temperature to the temperature at or between 50 and 250° C. over a period of about 1 hour and then maintaining such temperature for about 6 hours to prepare the heat treated, impregnated mesoporous silica.

23. The method of claim 11, wherein the carbonization further comprises slowly heating the heat treated, impregnated mesoporous silica to the temperature at or between 700 and 1500° C. over a period of about 4 hours and then maintaining such temperature for about 2 hours to prepare the carbonized, heat treated, impregnated mesoporous silica.

* * * * *

UNITED STATES PATENT AND TRADEMARK OFFICE
CERTIFICATE OF CORRECTION

PATENT NO. : 7,670,582 B2  Page 1 of 1
APPLICATION NO. : 11/434113
DATED : March 2, 2010
INVENTOR(S) : Chan-ho Pak et al.

It is certified that error appears in the above-identified patent and that said Letters Patent is hereby corrected as shown below:

Column 12, line 33, change "mixtures" to --mixture--.

Signed and Sealed this

Eighth Day of June, 2010

David J. Kappos
*Director of the United States Patent and Trademark Office*